Patented Sept. 1, 1953

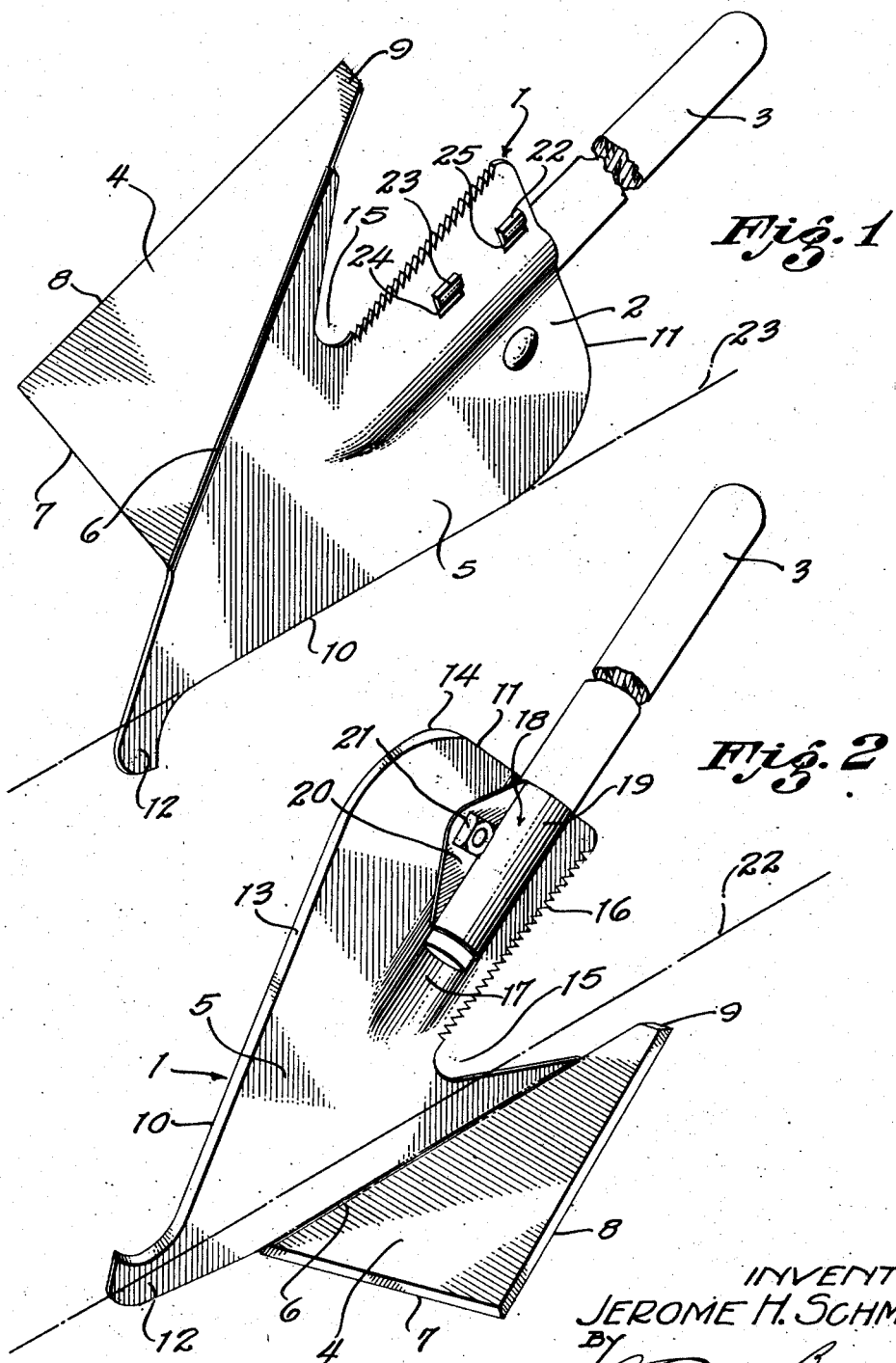

2,650,530

UNITED STATES PATENT OFFICE 2,650,530

GARDEN TOOL

Jerome H. Schmidt, Burbank, Calif.

Application November 29, 1948, Serial No. 62,499

1 Claim. (Cl. 97—66)

The present invention relates broadly to garden tools of the type which incorporate in a single instrument several useful devices, such as a lawn edger, a weeder, cultivator and pruner.

An object of the invention is the provision of a garden tool wherein the various portions thereof are so related as to render the same easy to handle and efficient in use.

A further object is the provision in a garden tool of a one-piece member so formed and constituted as to incorporate in its fabrication several devices of direct use in gardening.

A further object is the provision of a garden tool which is inexpensive in cost of manufacture and superior to garden tools now known to the inventor.

A further object is the provision of a universal type garden tool comprising a one-piece member so formed as to be balanced when used in conjunction with a handle secured thereto. With respect to this object, it may be said that direct force may be applied by the operator through the handle to the garden tool, the tool having no tendency to twist, rotate or be unbalanced, which makes manipulation of the tool easy of accomplishment.

In the drawing;

Figure 1 is a fragmentary perspective view of the garden tool; and

Figure 2 is a fragmentary perspective view of the tool shown in Figure 1 and revolved 180° from the showing of Figure 1.

Referring to the drawing, the garden tool is designated as an entirety by 1 and the same includes a one-piece head 2 adapted to be secured to a handle 3. The head is preferably formed of sheet steel or other metal which will hold an edge. The said head is provided with two portions 4 and 5 bent along a line 6 so that said portions are substantially in right angular relationship. The portion 4 constitutes a cultivator hoe and the same is substantially right triangular in form, of which edges 7 and 8 are the legs and the bent portion 6 the hypotenuse. The leg portions are beveled so as to provide sharp cutting edges. While the leg 8 may meet the hypotenuse at a point, still I prefer to truncate the member 4 so as to provide a beveled edge at 9 substantially parallel to the beveled edge at 7. Member 4 therefore has the appearance of a polygon of four sides.

The portion 5 is triangular in form in that the bent edge at 6 forms the hypotenuse therefor, while the leg portions 10 and 11 are in substantially right angular relationship. The leg portion 10 joins with the hypotenuse in a hook portion 12, and the hook portion, together with the edge of the leg 10, is beveled to form a cutting edge 13. The legs 10 and 11 do not meet at an angle, but rather leg 10 is curved or arcuate where it joins with the leg 11 as shown at 14, and this curved portion is likewise beveled to provide a cutting edge. A portion of member 5 included between the hypotenuse or edge 6 and the edge 11 is cut away or interrupted as shown at 15. This cut is in the form of a re-entrant V and one leg of the V is provided with teeth 16.

Member 5 is provided with an elongated concave groove 17 and said member carries clamp 18, the clamp cooperating with the groove 17 for the purpose of holding the end of handle 3. I have found it expedient to provide a clamp having a half round portion 19 carrying a wing 20, the wing being perforated or bored to permit passage of a bolt therethrough, the bolt being carried by the member 5, together with a nut 21 for securing the bolt and the member 18 in position of service on the member 5. In addition to and for the purpose of stabilizing the device, the half round portion 19 is provided with a pair of spaced lugs 22 and 23 adapted to be passed through slots 24 and 25 in the member 5. The spaced lugs may be bent after passage through the slots for engagement with member 5. This construction holds the end of the handle 3 quite securely to the head.

The operation, uses and advantages of the invention just described are as follows: If the device is to be used as a hoe, the device is held in the position shown in Figure 2, the beveled edge of leg 8 acting as the hoe portion relative to a ground line 22. The hoe may be tipped slightly so as to engage the soil. If it is desired to remove small weeds and at the same time leave the soil in a level condition, the beveled edge 7 may be utilized and the device is pushed forwardly. Thus, this edge 7 acts as a weeder, while the edge shown at 8 acts as a cultivator.

One of the most useful functions of the present device is it use as a lawn edger. Assuming the ground line shown at 23 in Figure 1, the hook end is passed between the grass and the edge of the walk. As this hook is sharp, it will cut the grass and the sod. It is preferable to move the device backwardly and forwardly, such as in a sawing motion, to aid in the cutting. After the grass has been cut, the device may be revolved or turned over from the position of Figure 1 to that of Figure 2, whereupon the edge 7 may be moved forwardly for the purpose of removing the cut grass and making a smooth clean edge.

For light pruning, the saw 16 may be used in the ordinary manner, the limb being caught in the cut-out portion 15 to assure its removal from the branches of a tree. Those that have use for a tool of this character will find many uses therefor, other than those mentioned.

I claim:

A garden tool, including a metal blank bent to provide two portions in substantially right-angular relationship, one portion being of greater area than the other portion thereof and both portions being substantially triangular in outline; the portion of greatest area provided with a forwardly extending hook and a leg of said portion and said hook being bevelled to provide a cutting edge extending between one leg thereof and the line of bend between the two portions, the portion of greatest area provided with a reentrant V-shaped slot and one edge bounding said slot provided with teeth, and the portion of lesser area having two of its legs bevelled to provide cutting edges.

JEROME H. SCHMIDT.

References Cited in the file of this patent

UNITED STATES PATENTS

| Number | Name | Date |
| --- | --- | --- |
| 299,876 | Sublett | June 3, 1884 |
| 489,058 | White | Jan. 3, 1893 |
| 798,412 | Hough | Aug. 29, 1905 |
| 903,085 | Heather | Nov. 3, 1908 |
| 908,266 | Jackson | Dec. 29, 1908 |
| 978,478 | Norman | Dec. 13, 1910 |
| 1,032,719 | Willis | July 16, 1912 |
| 1,699,071 | Kinney | Jan. 15, 1929 |
| 1,710,039 | Bauer | Apr. 23, 1929 |
| 1,917,731 | Pender | July 11, 1933 |
| 2,467,327 | McKee | Apr. 12, 1949 |